US008042759B2

(12) United States Patent
Bauer et al.

(10) Patent No.: US 8,042,759 B2
(45) Date of Patent: Oct. 25, 2011

(54) APPARATUS AND METHOD FOR WINDING ELECTRICAL COILS

(75) Inventors: Reinhold Bauer, Albbruck-Buch (DE); Roland Fischer, Buchs (CH); Daniel Künzli, Mellingen (CH); Christoph Müller, Dottikon (CH)

(73) Assignee: Tuboly-Astronic AG (CH)

( * ) Notice: Subject to any disclaimer, the term of this patent is extended or adjusted under 35 U.S.C. 154(b) by 701 days.

(21) Appl. No.: 12/067,134

(22) PCT Filed: Sep. 15, 2005

(86) PCT No.: PCT/CH2005/000547
§ 371 (c)(1), (2), (4) Date: Sep. 23, 2008

(87) PCT Pub. No.: WO2007/030955
PCT Pub. Date: Mar. 22, 2007

(65) Prior Publication Data
US 2009/0139636 A1 Jun. 4, 2009

(51) Int. Cl.
*B32B 37/00* (2006.01)

(52) U.S. Cl. ..................... 242/444.5; 156/171; 156/187; 156/192

(58) Field of Classification Search ............... 242/444.5; 156/171, 184, 187, 191, 192
See application file for complete search history.

(56) References Cited

U.S. PATENT DOCUMENTS

| | | | | |
|---|---|---|---|---|
| 1,970,462 | A * | 8/1934 | Le Boeuf | 242/444.5 |
| 2,029,577 | A * | 2/1936 | Le Boeuf | 242/444.5 |
| 2,649,252 | A * | 8/1953 | Bohne | 242/444.5 |
| 2,688,450 | A * | 9/1954 | Bell | 242/444.5 |
| 3,692,250 | A * | 9/1972 | Lee et al. | 242/444.5 |

FOREIGN PATENT DOCUMENTS

| | | |
|---|---|---|
| CH | 494 095 | 7/1970 |
| DE | 10 07 437 | 5/1957 |
| GB | 1 527 324 | 10/1978 |

OTHER PUBLICATIONS

International Search Report dated May 31, 2006 issued in corresponding PCT Application No. PCT/CH2005/000547.

* cited by examiner

*Primary Examiner* — Jeff Aftergut
(74) *Attorney, Agent, or Firm* — Ostrolenk Faber LLP

(57) ABSTRACT

A winding machine for electrical coils to be wound into layers has a device which supplies a material to the coil to be wound in order to separate adjacent layers of the coil from one another. The device has a device for producing a predetermined breaking point in the material, and a measuring unit. The measuring unit determines when the device for producing a predetermined breaking point is to be activated in order to produce a predetermined breaking point in the material. The device also has a guide device which fixes the material on the coil to be wound in the vicinity of the predetermined breaking point at a predetermined time, in order to sever the material at the predetermined breaking point. The winding machine therefore anticipates when a layer change is required, in order to then produce a predetermined breaking point in the material at a distance from the coil. The predetermined breaking point is pulled through as far as the coil, and this enables the material to be guided in a controlled and reliable manner. The material is torn off at the predetermined breaking point only after the material is secured on the coil.

18 Claims, 1 Drawing Sheet

APPARATUS AND METHOD FOR WINDING ELECTRICAL COILS

CROSS REFERENCE TO RELATED APPLICATION

The present application is a 35 U.S.C. §§371 national phase conversion of PCT/CH2005/000547, filed Sep. 15, 2005, the disclosure of which has been incorporated herein by reference. The PCT International Application was published in the German language.

BACKGROUND

The exemplary embodiments of the invention described here relate in general to an apparatus and a method for winding of electrical coils.

PRIOR ART

In a known machine for winding of electrical coils, a form is driven in order to wind a coil wire onto the former. The coil wire is surrounded by an electrically insulating material (for example, varnish). The machine winds the coil wire layer by layer on the former. Once a layer has been wound, an isolation material is introduced in order to separate and to electrically isolate this layer from the next layer, in addition to the varnish insulation. This isolation material represents layer insulation.

In order, for example, to wind a compact, that is to say densely packaged, high-voltage coil, the layer insulation should be wound as smoothly as possible. The thickness of the layer insulation must be optimized for the voltage relationships in the coil in order, for example, to avoid voltage flashovers. For a compact coil with an optimum insulation thickness, the layer insulation is cut off at the end of a layer during the winding process and is adhesively bonded again, by means of an adhesive tape, when a wire layer change takes place. In the known winding machine, this is done manually, and typically requires the winding machine to be stopped twice for each wire layer.

DESCRIPTION OF THE INVENTION

One aim of the exemplary embodiments of the invention described here is therefore to further automate the winding of coils in order in this way to improve the winding efficiency.

One aspect of the invention relates to an apparatus for winding of electrical coils having a former for an electrical coil which is to be wound in layers, and having a device which supplies a material to the coil to be wound, in order to isolate adjacent layers of the coil from one another. The device has a device which is arranged remotely from the former in order to produce a weak point in the material, and has a measurement unit which is arranged between the former and the device for production of a weak point and which determines when the device for production of a weak point should be activated in order to produce a weak point in the material. The device also has a guide device, which fixes the material close to the weak point on the coil to be wound at a predetermined time, in order to cut the material at the weak point.

A further aspect of the invention relates to a method for winding of electrical coils, in which layers which are located one above the other and are composed of an electrical conductor are isolated from one another by a material. A first end of the material is attached to a fixed point of a layer of a coil to be wound in order to wind the material onto the layer at a nominal rotation speed. A weak point is produced in the material as a function of the instantaneous circumference of the coil to be wound, and of the speed of movement of the material. The material is mounted on the coil to be wound in the area of the weak point, and a tensile force is exerted on the material in order to separate the material at the weak point.

One advantage of an apparatus such of this and of a method such as this is that the winding process is carried out continuously, and is not interrupted by stops. This is made possible by determining in advance when a layer change is required, and by then producing a weak point in the material away from the coil. The weak point extends as far as the coil, thus allowing the material to be guided in a controlled and safe manner. The material is torn off at the weak point only after it has been mounted on the coil. Once it has been torn off, the material is held securely again in order to be ready to start a new layer of material.

BRIEF DESCRIPTION OF THE DRAWINGS

Further refinements, advantages, new characteristics and applications of the invention will become evident from the following detailed description, with reference to the drawings. Identical elements in the drawings are provided with the same reference symbols. In the drawings.

DETAILED DESCRIPTION OF A NUMBER OF EXEMPLARY EMBODIMENTS

A number of exemplary embodiments will be described in detail with reference to an apparatus for winding of electrical coils of many different types and sizes. By way of example, the apparatus is suitable for winding of high-voltage coils, in which an isolation material is inserted after each layer of electrical wire. Coils such as these are used, for example, in transformers and electric motors. The apparatus is referred to in the following text as the winding machine 1.

Figure 1:
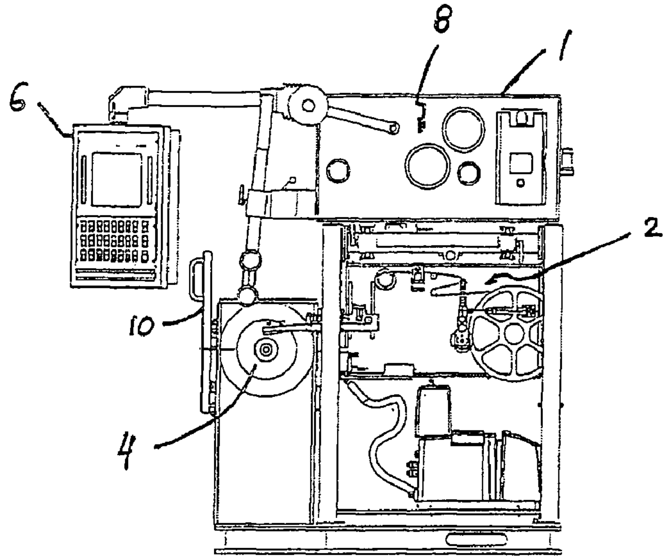
FIG. 1 shows a schematic side view of one exemplary embodiment of a winding machine.

FIG. 1 shows a schematic side view of one exemplary embodiment of a winding machine 1. The illustrated winding machine 1 has a control device 6, by means of which an operator can control the winding machine 1. The control device 6 in one exemplary embodiment contains a control and monitoring device with application-specific control programs, an input unit (for example, a keyboard) for inputting control and coil parameters and an output unit (for example, an LCD screen) for displaying operating and coil parameters, and fault messages. The control device 6 in one exemplary embodiment may be a computer equipped with appropriate programs.

A wire unwinding device 8, a rolling device 2 and a winding device 4 are accommodated in a frame of the winding machine 1. A protective guard, for example, a protective glass or metal grating or a combination of glass and a grating, is attached to the frame in the area of the winding device 4 and prevents any part that may break off from being able to reach the exterior and injure the operator. The wire brake 8 in one exemplary embodiment is an apparatus which unrolls an electrical conductor, which is surrounded by an electrical insulation material, for example, a wire, from a supply roll and supplies the winding device 4. In the following description, a wire unwinding device 8 such as this is referred to as a wire brake 8. The wire is one example of an electrical conductor and may have different diameters, for example between about 0.4 mm and about 4 mm. However, it is also possible to use a rectangular wire.

The winding device 4 has a former which rotates an electrical drive about a longitudinal axis. The former may be a wood, plastic or metal cylinder, or may be formed by a low-voltage coil. In the exemplary embodiment illustrated in FIG. 1, the former is arranged horizontally and across the view of the operator. A screw or clamping apparatus secures one wire end on the former initially and during the winding process. Once the wire or some other electrical conductor has been mounted on this former, the winding device 4 pulls the wire, for example, and unwinds it onto the former. In one exemplary embodiment, the former is moved in a first direction along its longitudinal axis during rotation, in order to wind a coil layer. When a fixed side end of the coil to be wound is reached, the horizontal movement direction is reversed, in order to wind a further coil layer. This process is repeated until the desired number of layers has been wound. In another exemplary embodiment, instead of the former, the wire brake 8 can be designed such that it moves the wire backwards and forwards in the horizontal direction.

In the field of coil winding technology, a layer is a layer of an electrical conductor (for example, wire) which is created when the electrical conductor is wound, for example, onto a cylinder and the individual turns of the electrical conductor are located alongside one another. The individual turns may touch or may be separated by a gap. However, the expression layer should also be understood as meaning a layer of an electrical conductor in which individual turns may overlap.

The winding machine 1 is designed such that the unwinding device 2 introduces a material which separates the individual layers from one another between the individual coil layers. The unwinding device 2 is illustrated schematically in FIG. 2 and will be described in more detail in the following text. The material increases the distance between adjacent layers and therefore reduces the risk of the voltage flashing over from one layer to an adjacent layer. The material may be paper, plastic or any other nonconductive material which separates the layers and can be shaped in any desired manner (for example, in the form of a strip). In one exemplary embodiment, the material is a paper strip or ribbon with a width of about 1 to 5 cm and a thickness of about 0.012 to 0.15 mm. It is self-evident that the material, its width and its thickness are chosen for the respective application (for example, voltage, temperature and humidity range).

Figure 2:
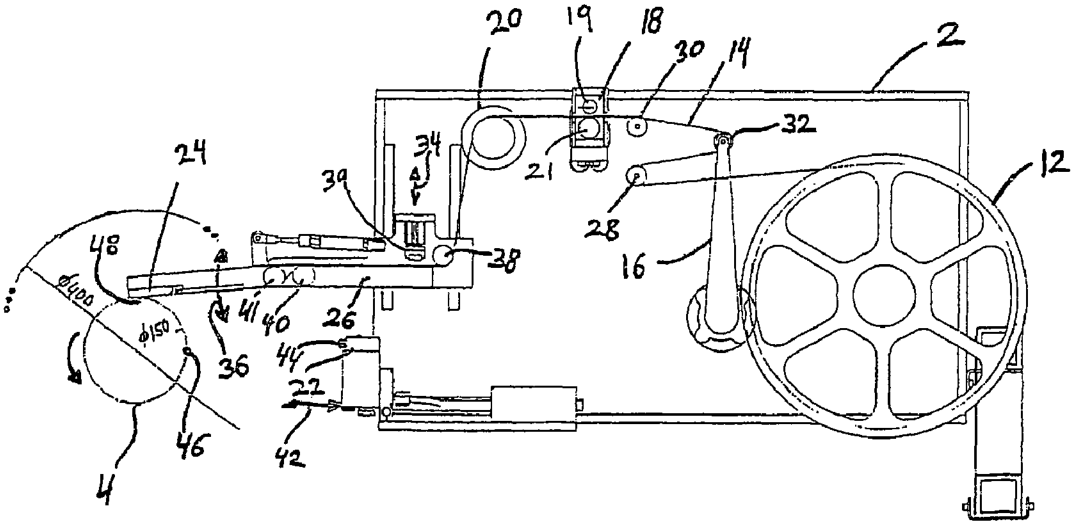
FIG. 2 shows a schematic side view of one exemplary embodiment of a roll for isolation material.

FIG. 2 shows a schematic side view of one exemplary embodiment of the unwinding device 2. The unwinding device 2 has a mount 12 on which a paper strip 14 is wound as insulation material. The following text refers to the unwinding device 2 as the insulation unwinder 2.

In FIG. 2, the former 12 is a roller, which is rotated counterclockwise. A plurality of guide rollers 28, 30, 32, an apparatus 18 for production of a locally weakened area in the material, that is to say a weak point, a measurement unit 20 and a guide device 26 guide the paper strip 14 to the winding device 4. The height of the guide device 26 is adjustable (indicated by a double-headed arrow 34) and it can be pivoted vertically about an axis 41 (indicated by a double-headed arrow 36) in order to match it to the coil diameter, which increases during the winding process. By way of example, the coil diameter in FIG. 2 can change from about 150 mm to about 400 mm.

The paper strip 14 is unrolled by the former 12 and is braked by a motor or motors. In order to ensure uniform paper tension, the tension is controlled by means of a dancer unit 16, which acts on the former 12. The paper strip 14 is passed over the guide rollers 28, 30, 32 to the apparatus 18. The measurement unit 20 determines the actual coil circumference and speed of the paper strip 14. Furthermore, the distance between the coil and the apparatus 18 is known and is used to calculate when the apparatus 18 should be activated in order to produce the weak point. By way of example, the known distance between the apparatus 18 and the coil former is divided by the determined coil circumference. This division results in the number of revolutions which the winding device 4 carries out before the weak point reaches the coil.

The apparatus 18 weakens the paper strip 14 in synchronism with the tape speed. In one exemplary embodiment, the apparatus 18 weakens the paper strip 14 by perforation at the desired point. The perforation therefore acts as a weak point. In order to produce the perforation, in one exemplary embodiment, the apparatus 18 presses the paper strip 14 against an opposing piece 21 by means of a toothed blade 19. The blade 19 is arranged such that it extends essentially transversely (for example at an angle of approximately 90°) with respect to the length of the paper strip 14. The blade 19 and the opposing piece 21 rotate in synchronism with the strip speed. The opposing piece 21 may have a notch or an elastic surface (for example rubber-coated) which the teeth can enter. The teeth punch through the paper strip 14, but without cutting through the paper strip 14. Nevertheless, the teeth weaken the paper locally, for example, transversely with respect to the pulling direction.

Instead of a toothed blade, the perforation can also be produced by means of a toothed wheel. In other exemplary embodiments, the desired local weakening of the paper, that is to say the production of a weak point, can also be carried out in a different manner, for example by crushing, bending or scoring. A weak point produced in this way may also extend essentially transversely to the length of the paper strip 14.

The guide device 26 passes the paper strip 14 to the winding means 4 and to the coil to be wound, in a controlled manner. For this purpose, the variable height guide device 26 which can rotate, has guide rollers 38, 40 and a vacuum plate 24. The vacuum plate 24 is connected to a suction pump which produces a vacuum compression sufficient to securely hold the paper strip 14, or one end of the paper strip 14.

In the illustrated exemplary embodiment, an apparatus 22 for applying an adhesive to the coil is fitted to the insulation unrolling device 2. The apparatus 22 can be moved towards and away from the winding device 4 (indicated by a double-headed arrow 42). In one exemplary embodiment, the adhesive is hot glue, which is heated in the apparatus 22 and is applied through a nozzle 44. In another exemplary embodiment, the adhesive may be a glue which cures in seconds, a cold glue or an adhesive tape.

In order to apply the hot glue, the apparatus 22 is expanded, for example to a distance of about 10 to 40 mm from the former and from the coil to be wound while the former and the coil to be wound are being rotated counterclockwise. The hot glue is sprayed onto the coil to be wound by means of the nozzle 44 in order to create an adhesion point 46. The adhesion point 46 is applied approximately a quarter of a revolution before a stopping point 48. The hot glue is likewise applied without having to stop the coil or the paper strip 14.

At the stopping point 48, the paper strip 14 can be pressed onto the adhesion point 46 in the vicinity of, but not at, the weak point, to be precise such that the weak point is located in front of the adhesion point 46 in the movement direction of the paper strip 14. For this purpose, the paper strip 14 is pressed onto the adhesion point 46 by means of the vacuum plate 24.

Once the adhesion point 46 has passed the stopping point 48, the guide device 26 stops the paper strip 14 such that it can be torn off at the perforated point. One end of the paper strip 14, which has now been cut, remains on the adhesion point 46, while the vacuum plate 24 holds the loose end of the paper strip 14 until it is once again bonded onto the coil to be wound at the end of a layer, in order to wind the next layer of insulation material.

In one exemplary embodiment of the winding machine 1, the control device 6 controls the process of adhesive bonding of a loose end of the paper strip 14. During the winding process, a loose end exists before the first layer of the insulation material is wound, and after the paper strip 14 has been torn off after an insulation layer has been wound. This loose end can be attached to the coil to be wound in order to allow reliable winding of an insulation layer.

One precondition for the process of adhesive bonding is that the paper strip 14 is in position and that the vacuum plate 24 holds the loose end. The control device 6 reduces the rotation speed of the winding device 4, for example, from about 400 rpm to about 20 rpm. Controlled by the control device 6, the adhesive device 22 moves into position (at a distance of about 10 mm from the coil) and applies the adhesive. The insulation unwinding device 2 reduces the tension on the paper strip 14 to a minimum tension (for example, of about 16 N) calculated from the insulation cross section. The guide device 26 is lowered, in order to allow the vacuum plate 24 to press the loose end of the paper strip 14 onto the adhesion point 46 at the stopping point 48. An insulation and wire layer change takes place after two revolutions of the coil, and the rotation speed is increased to the nominal rotation speed.

In one exemplary embodiment of the winding machine 1 the control device 6 also controls the process of cutting the paper strip 14. One precondition for the cutting process is that a layer of insulation material including an edge strip has been completely wound. The paper strip 14 therefore extends from the insulation layer approximately to the guide roller 40 of the guide device 26. The control device 6 reduces the rotation speed of the winding device 4, for example, from about 400 rpm to about 60 rpm, and the insulation unwinding device 2 reduces the tension on the paper strip 14.

The measurement unit 20 determines when the apparatus 18 should be activated in order to perforate the paper strip 14. Once it has been confirmed the paper strip 14 is perforated in synchronism with the strip speed and is pulled further in the direction of the winding device 4.

Controlled by the control device 6, the adhesive device 22 is moved into position (for example at a distance of about 10 mm from the coil), applies the adhesive to the adhesion point 46, and the adhesive device 22 is moved back to its initial position.

The winding device 4 rotates the adhesion point 46 in the direction of the stopping point 48. The guide device 26 is lowered in order to allow the vacuum plate 24 to press the paper strip 14 onto the adhesion point 46 at the stopping point 48, in the vicinity of the perforation point.

A clamping device 39 is connected to the guide device 26 and is activated such that the paper strip 14 is stressed and is torn off at the perforation point. The clamping device has a pneumatic cylinder with a rubber coating applied to it, which is pressed onto the insulation material. This is done immediately after the vacuum plate 24 has pressed the paper strip 14 onto the adhesion point. The control device 6 switches on the vacuum, in order to hold the loose end of the paper strip 14. The vacuum plate 24 is lifted off the coil, and the rotation speed is increased to the nominal rotation speed.

While preferred embodiments of the invention have been described in this application, it should be clearly noted that the invention is not restricted to these embodiments and can be implemented in other manners as well, within the scope of the following patent claims.

The invention claimed is:

1. A method for winding of electrical coils, in which layers which are located one above the other and are composed of an electrical conductor are isolated from one another by a material in which:

a first end of the material is attached to a fixed point of a layer of a coil to be wound in order to wind the material onto the layer at a nominal rotation speed, a weak point is produced in the material as a function of the instantaneous circumference of the coil to be wound, and of the speed of movement of the material, the material is mounted on the coil to be wound in the area of the weak point, and a tensile force is exerted on the material in order to separate the material at the weak point.

2. The method as claimed in claim 1, in which the material is a strip of paper or plastic, which is perforated, crushed or bent in order to produce the weak point.

3. The method as claimed in claim 1, in which, in order to attach the first end of the material the first end is held, an adhesive is applied to the fixed point, and the first end is pressed onto the applied adhesive.

4. The method as claimed in claim 3, in which, in order to attach the first end of the material, the rotation speed is additionally reduced before application of the adhesive, and is increased to the nominal rotation speed again after the first end has been pressed on.

5. The method as claimed in claim 3, in which, in order to attach the first end of the material, a layer change of the material is carried out after the first end has been pushed on.

6. The method as claimed in claim 1, in which, in order to mount the material on the coil to be wound in the area of the weak point, the rotation speed is reduced, an adhesive is applied to a point which is chosen such that the weak point is located in its vicinity, the material is pushed into the adhesive in the area of the weak point, the material is stretched so that it is separated at the weak point, and the rotation speed is increased to the nominal rotation speed.

7. An apparatus for winding of electrical coils, having a former for an electrical coil which is to be wound in layers, and having a device which supplies a material to the coil to be wound, in order to isolate adjacent layers of the coil from one another, with the device having a device which is arranged remotely from the former in order to produce a weak point in the material, having a measurement unit which is arranged between the former and the device for production of a weak point, and determines when the device for production of a weak point should be activated in order to produce a weak point in the material, and having a guide device, which fixes the material close to the weak point on the coil to be wound at a predetermined time, in order to cut the material at the weak point.

8. The apparatus as claimed in claim 7, in which the material is a strip of paper or plastic.

9. The apparatus as claimed in claim 8, in which the material has a thickness in the range from about 0.012 to about 0.15.

10. The apparatus as claimed in claim 7, in which the device for production of a weak point has a first element which presses the material against a second element in order to perforate, to crush or to bend the material, in order to produce the weak point at a point which has been weakened in this way.

11. The apparatus as claimed in claim 10, in which the first element is a toothed blade whose teeth perforate the material.

12. The apparatus as claimed in claim 7, in which the measurement unit is designed in order to use the instantaneous circumference of the coil to be wound and the speed of the material to determine when the device for production of a weak point should be activated in order to produce the weak point in the material.

13. The apparatus as claimed in claim 7, in which the guide device has a vacuum plate which can be connected to a suction pump in order to hold the material securely by vacuum pressure.

14. The apparatus as claimed in claim 7, in which an apparatus is provided for application of an adhesive to the coil to be wound.

15. The apparatus as claimed in claim 14, in which the apparatus for application of an adhesive can be moved towards and away from the former.

16. The apparatus as claimed in claim 14, in which the apparatus for application of an adhesive has a nozzle by means of which an adhesion point can be fixed on the coil to be wound.

17. The apparatus as claimed in claim 16, in which the guide device is designed such that it presses the material onto the adhesion point in order to fix the material on the coil to be wound.

18. The apparatus as claimed in claim 17, in which the guide device is designed such that it releases the fixed material close to the adhesion point so that the material can be separated by pulling on the weak point.

* * * * *